United States Patent Office 3,786,090
Patented Jan. 15, 1974

3,786,090
ALKOXYACETANILIDE COMPOUNDS
Anwar Hussain, Lawrence, Kans., assignor to Interx
Research Corporation
No Drawing. Filed Sept. 29, 1971, Ser. No. 184,933
Int. Cl. C07c 103/38
U.S. Cl. 260—562 A
3 Claims

ABSTRACT OF THE DISCLOSURE

Novel p-alkoxyacetanilide compounds of the formula:

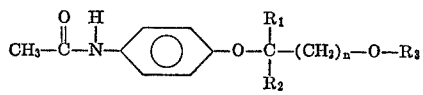

wherein $R_1$ is hydrogen, alkyl, alkoxy, cycloalkyl or monocyclic aryl, $R_2$ is alkyl, alkoxy, cycloalkyl or monocyclic aryl, $R_3$ is alkyl, cycloalkyl or monocyclic aryl, and $n$ is 0 to 4. The compounds are useful as analgesics and antipyretics.

BACKGROUND OF THE INVENTION

This invention relates to both novel and useful ethers of acetanilide. More particularly, the invention pertains to new substituted p-alkoxyacetanilide compounds represented by Formula 1 of the following general formula:

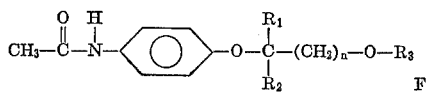

Formula I wherein $R_1$ is a member selected from the group consisting of hydrogen, lower alkyl, lower alkoxy, lower cycloalkyl and monocyclic aryl, $R_2$ is a member selected from the group consisting of lower alkoxy, lower cycloalkyl, and monocyclic aryl, $R_3$ is a member selected from the group consisting of lower alkyl, lower cycloalkyl and monocyclic aryl, and wherein $n$ is 0 to 4. The compounds of this invention are physiologically active possessing valuable analgesic and antipyretic activities.

The pharmaceutically important compound p-hydroxyacetanilide, commonly known as acetaminophen, is widely used for its analgesic and antipyretic activities. This compound is used for these effects because it has the medically known advantage that undesirable side effects are rarely associated with its use. Merck Index, eighth edition, page 5, 1968. However, there are three serious problems that are encountered in using acetaminophen, which problems seriously diminish the efficacy of the drug. One problem is that acetaminophen is very slightly soluble, and when it is orally administered, a substantial amount fails to form a physiologically available form during passage through the gastrointestinal tract. Accordingly, it is excreted without any benefit to the recipient. Often, as much as "seventy to ninety percent" of the drug is lost in this manner. Canadian Journal of Pharmaceutical Science, vol. 6, No. 2, pages 38 to 42, 1971. A second encountered problem is that a very significant portion of the administered acetaminophen is transformed into inactive forms during its absorption and passage through the gastrointestinal mucosa conjugated to a glucuronide or sulfate conjugate thusly:

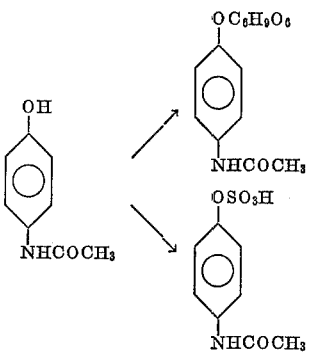

which conjugates are therapeutically inactive. Thus, very little of the acetaminophen orally administered reach the systemic system in a physiologically available form. A third problem is the bitter taste of p-hydroxyacetanilide that is unacceptable to many who need the agent.

The prior art attempted to overcome the problems of poor absorption and inactivation by metabolic conjugation by centering on the administration of a massive dose of acetaminophen. However, because of the low water solubility of the compound the fraction of the dose absorbed is still relatively small, and no substantial beneficial effect is obtained by the use of these doses. Additionally, the administration of larger doses tends to distribute the compound over a larger segment of the gastrointestinal tract with a small concentration in each local area which retains the low solubility of the compound, and also can be conjugated to inactive forms. Moreover, the compound administered retains its bitter taste that limits its uses as an analgesic suspension for children or as a chewable analgesic tablet. This wide use of acetaminophen with its known problems creates an immediate and pressing need for a new pharmaceutical form of acetaminophen that possesses its medical properties and is essentially free from the unwanted effects associated with the prior art form of acetaminophen.

Accordingly, it is an immediate object of this invention to provide novel pharmaceutical compounds that are useful as analgesic and antipyretics.

Another object of the invention is to provide a novel and useful physiochemical form of acetaminophen that is essentially free from the unwanted effects associated with the prior art.

Yet still another object of the invention is to provide novel p-alkoxyacetanilide compounds with an improved taste that possess valuable analgesic and antipyretic pharmaceutical and physiological properties.

Still another object of the invention is to provide a new and useful p-alkoxyacetanilides that can contact the sensitive gastric mucosa while simultaneously remaining essentially free from the tribulations associated with the prior art.

Still yet another object of the invention is to provide novel p-alkoxyacetanilide derivatives that possess an enhanced rate of absorption into the circulatory system due to an increase in the absorption of the derivatives at the surface of the mucosa of the gastrointestinal tract in immediate contact with the derivatives.

3

Yet still another object of the invention is to provide novel p-alkoxyacetanilide compounds that do not lend themselves to forming conjugates and possess an enhanced rate of absorption at the mucosa of the gastrointestinal tract wherein the compounds are quickly hydrolyzed in the mucosal tissues or they enter the circulatory system wherein they are hydrolyzed to p-hydroxyacetanilide.

These and other objects, features and advantages of the invention will become more apparent from a consideration of the accompanying disclosure and the appended claims.

SUMMARY OF THE INVENTION

This invention concerns novel compounds of the following general formula:

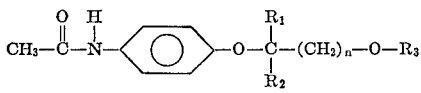

wherein $R_1$ is hydrogen, alkyl, alkoxy, cycloalkyl, or monocyclic aryl; $R_2$ is alkyl, alkoxy, cycloalkyl or monocyclic aryl; $R_3$ is alkyl, cycloalkyl or monocyclic aryl; and $n$ is 0 to 4. The compounds are useful as analgesics and antipyretics and they can be administered per se, or they can be administered in pharmaceutical composition form when they are admixed with a pharmaceutically acceptable carrier.

DESCRIPTION OF THE INVENTION

In ataining the objects, features and advantages of the present invention, it has now been found that p-alkoxyaceanilitde compounds embraced by Formula 1:

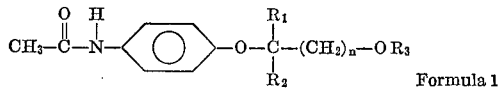

Formula 1 wherein $R_1$ is hydrogen, alkyl, alkoxy, cycloalkyl or monocyclic aryl; $R_2$ is alkyl, alkoxy, cycloalkyl or monocyclic aryl; $R_3$ is alkyl, cycloalkyl or monocyclic aryl; and $n$ is 0 o 4, can be made available to the art for use as an analgesic or antipyretic with an enhanced rate of absorption in a localized area in the gastrointestinal tract to overcome the problems of excess excretion, inactivation by conjugation and bitter taste.

In the present disclosure and the accompanying claims, the definitions and terms in the foregoing Formula 1 and where they appear elsewhere throughout the specification and the accompanying claims, their usage thereof has the following significance:

The terms "p-alkoxyacetanilide" and "p-alkoxyacetanilide and derivatives thereof" as used herein denotes a compound according to Formula 2 as follows:

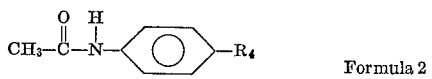

Formula 2 wherein $R_4$ is an ether moiety

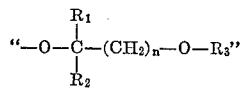

as covalently bonded to the phenyl ring at its para position. The ether moiety is attached through an ether carbon structure

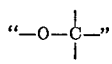

that can be conveniently named "alkoxy" with "α-methoxy" as shown. The term "$(CH_2)_n$" identifies an alkylene group of 0 to 4 carbon atoms bonded to the α-carbon of the methoxy goup, which can also be identified as ethoxy, propoxy and the like as $n$ correspondingly increases from 0 to 4 with $R_1$, $R_2$ and $R_3$ bonded to the carbon atoms of the respective alkoxy groups at carbons identified as α, β, γ and the like.

4

By "lower alkyl" at $R_1$, $R_2$ and $R_3$ is meant straight or branched chain alkyl radicals of 1 to 6 carbon atoms inclusive, such as methyl, ethyl, n-propyl, iso-propyl, n-butyl, sec-butyl, n-pentyl, n-hexyl, iso-hexyl, 1,4-dimethylbutyl, 2,2-dimethylbutyl, and the like.

The term "lower alkoxy" appearing in the instant specification, for example, at $R_1$ and $R_2$, denotes both straight and branched chain lower alkoxy hydrocarbon groups of 1 to 6 carbon atoms inclusive, such as methoxy, ethoxy, n-propoxy, butoxy, hexoxy, sec-butoxy, amoxy, iso-amoxy, and the like.

The term "monocyclic aryl" as used herein contemplates monocyclic carbocyclic aryl radicals having 6 to 10 carbons, for instance, phenyl and substituted phenyl radicals such as lower alkyl phenyl (for example, o-, m-, or p-tolyl, ethylphenyl, butylphenyl, and the like); di(lower alkyl) phenyl (for example, 2,4-dimethylphenyl, 3,5-diethylphenyl, and the like); halophenyl (for example, chlorophenyl, bromophenyl, iodophenyl, fluorophenyl), and the like.

The term "cycloalkyl" includes monocyclic cycloalkyl radicals containing from 3 to 6 carbon atoms inclusive, such as cyclopropyl, cyclobutyl, cyclopentyl, cyclohexyl, methylcyclopentyl, 2,3-dimethylcyclopropyl, ethylcyclobutyl, and the like.

The novel p-alkoxyacetanilide compounds embraced by Formula 1 are prepared by contacting and reacting p-hydroxyacetanilide, generally under anhydrous conditions, with stoichiometric amounts, usually with an excess of an enol ether; for example, with from about 1 to about 30 or more molecular equivalents of the enol ether for each hydroxyl group present in the p-hydroxyacetanilide present as a reactant. The reaction is carried out under anhydrous conditions, in an inert organic solvent, and in the presence of a small amount of an acid catalyst. The reaction is usually carried out at a temperature of about 10° C. to about 90° C., usually at ambient temperature of about 25° C., and at atmospheric pressure, or at higher pressures of from 1 to 10 atmospheres, and the like. The starting materials begin to react on contact, but it is generally preferable to carry out the reaction for about 10 minutes to about 90 hours to produce from the starting materials the corresponding ether compounds of Formula 1.

The starting enol ethers used for combining with the hydroxyl group of the p-hydroxyacetanilide to form the novel, improved acid labile esters of Formula 1 with improved properties are encompassed by the following formula: $R_4=CH-(CH_2)_n-O-R_5$ wherein $R_4$ and $R_5$ are the same or different substituents such as alkyl, alkoxy, cycloalkyl or monocyclic aryl as above defined, and $n$ is 0 to 4. The starting ethers, whether symmetrical or mixed ethers, are obtained from commercial sources or they are readily prepared by known techniques, such as by the catalytic hydration of olefins, by the dehydration of alcohols, or by the Williamson synthesis as described in The Encyclopedia of Chemistry, 2nd ed., pages 398 to 399, 1966, Van Nostrand Reinhold Co., New York, N.Y. The starting ethers can also be prepared by the thermal decarboxylation of unsaturated acids to yield the corresponding, symmetrical or mixed alphatic, cycloaliphatic or aromatic enol ether according to J. Org. Chem., vol. 27, pages 3875 to 3878, 1962; and by the Claisen type reaction as reported in Ber., vol. 31, pages 1019 to 1924, 1898, and in Organic Reactions, vol. 11, pages 1 to 48, 1944, John Wiley & Sons Inc., New York, N.Y. Exemplary enol ethers that contain an olefinic group suitable for the purpose of the invention are ethers such as vinyl ether, ethyl vinyl ether, propyl vinyl ether, sec-butyl vinyl ether, tert-butyl vinyl ether, hexyl vinyl ether, 2-ethylhexyl vinyl ether, cyclohexylmethyl vinyl ether, cyclohexylpropyl vinyl ether, cyclobutyl vinyl ether, cyclopropyl vinyl ether, benzyl vinyl ether, methoxymethyl vinyl ether, propoxyethyl vinyl ether, butoxyethyl vinyl ether, propoxypropyl vinyl ether, cyclohexoxyethyl vinyl ether, phenoxyethyl vinyl ether, butylphenoxyethyl vinyl ether, benzyloxyethyl vinyl ether, methyl isopropenyl ether, ethyl isopropenyl ether, isopropyl isopropenyl ether, n-butyl isopropenyl ether, hexyl isopropenyl ether, propoxypropyl isopropenyl ether, methyl prop-2-enyl ether, 2-ethylhexyl prop-2-enyl ether, ethoxyethyl prop-2-enyl ether, propoxypropyl prop-2-enyl ether, benzyl prop-2-enyl ether, methoxybenzyl but-3-enyl ether, propyl but-3-enyl ether, hexyl but-3-enyl ether, phenyl but-3-enyl ether, methoxymethyl pent-4-enyl ether, prop-2-enyl ether, and the like.

Examples of suitable inert, organic solvents for performing the reaction includes any organic solvent that does not adversely affect the reactants or the resulting products, including anhydrous halogenated solvents such as methylene chloride, chloroform, carbon tetrachloride, ethylene chloride, anhydrous ether solvents such as diethyl ether, dimethyl ether, methylethyl ether, di-n-butyl ether; and other solvents such as anhydrous tetrahydrofuran, dioxane, diglyme, n-hexane, cyclooctane, benzene, heptane, cyclohexane; mixtures thereof, and like aliphatic, cycloaliphatic and aromatic hydrocarbon solvents.

Representative of acid catalysts suitable for performing the reaction according to the spirit of the invention are p-toluenesulfonic acid, hydrochloric acid, anhydrous hydrobromic acid, Lewis acids such as boron trifluoride, boron trichloride, boron trichloride etherate, stannic oxychloride nitrobenzenesulfonyl chloride, phosphorus oxychloride, phosphorus pentachloride, zinc chloride, benzene sulfonyl chloride, mixtures thereof, and the like. The amount of catalysts employed is generally 0.001 to about 0.5 molar equivalents per molar equivalent of enol ether. However, smaller or larger amounts of a ctalyst per mol may be employed. Usually, the addition of trace amounts will provide sufficient catalyst for successfully carrying out the reaction.

The following examples are set forth as representative methods illustrative of the spirit of the present invention. These examples are not to be construed as limiting the scope of the invention as other functionally equivalent means will be readily apparent to those skilled in the subject art in the light of the present specification and the accompanying claims.

Example 1

Into a dry glass stoppered flask is placed 6 g. of p-hydroxyacetanilide and 25 ml. of freshly distilled, anhydrous ethyl vinyl ether wih a constant shaking of the flask to mix the reactants. Next, trace amounts of the acid catalyst, anhydrous p-toluenesulfonic acid is added to the flask and the flask agitated until all the reactants are well mixed. The reaction mixture is then allowed to stand at ambient conditions for 2 to 3 hours and then filtered. The solvent is then stripped from the product under reduced pressure and 10 ml. of petroleum ether is added thereto. The flask is then placed in a standard freezer overnight to yield crystals of p-($\alpha$-ethoxy-$\alpha$-methyl)methoxyacetanilide.

Example 2

Repeating the procedure of Example 1 but replacing ethyl vinyl ether with the following:

cyclopropyl vinyl ether,
methyl vinyl ether,
n-butyl vinyl ether,
isobutyl vinyl ether,
cyclohexylmethyl vinyl ether,
phenoxymethyl vinyl ether,
benzyl vinyl ether, and,
tert-butyl vinyl ether the following p-(substituted)alkoxyacetanilides are formed:

p-($\alpha$-cyclopropoxy-$\alpha$-methyl)methoxyacetanilide,
p-($\alpha$-methoxy-$\alpha$-methyl)methoxyacetanilide,
p-($\alpha$-n-butoxy-$\alpha$-methyl)methoxyacetanilide,
p-($\alpha$-isobutoxy-$\alpha$-methyl)methoxyacetanilide,
p-($\alpha$-benzyloxy-$\alpha$-methyl)methoxyacetanilide, and
p-($\alpha$-phenoxymethoxy-$\alpha$-methyl)methoxyacetanilide,
p-($\alpha$-cyclohexylmethoxy-$\alpha$-methyl)methoxyacetanilide,
p-($\alpha$-tert-butoxy-$\alpha$-methyl)methoxyacetanilide.

Example 3

To 100 ml. of anhydrous ethyl vinyl ether is added 3 g. of p-hydroxyacetanilide and the mixture stirred for a short time. Next, 25 ml. of hydrochloric acid saturated dichloromethane is added to the p-hydroxyacetanilide ethyl vinyl ether mixture and the newly formed mixture stirred until the mixture is thoroughly mixed. Next, the reacting mixture is allowed to stand for 15 to 20 hours at room temperature and atmospheric pressure. The solvents are stripped in vacuo to yield the product p-($\alpha$-ethoxy-$\alpha$-methyl)methoxyacetanilide.

Example 4

Repeating the procedure of Example 3 but substituting for ethyl vinyl ether the following ethers:

methyl isopropenyl ether,
isopropyl isopropenyl ether,
methyl prop-1-enyl ether,
ethoxyethyl prop-1-enyl ether,
benzyloxyethyl vinyl ether,
ethyl but-1-enyl ether, and
cyclopropylmethyl isopropenyl ether, the following p-(substituted)alkoxyacetanilides are formed:

p-($\alpha$-ethoxy-$\alpha$,$\alpha$-dimethyl)methoxyacetanilide,
p-($\alpha$-isopropoxy-$\alpha$,$\alpha$-dimethyl)methoxyacetanilide,
p-($\alpha$-methoxy-$\alpha$-ethyl)methoxyacetanilide,
p-($\alpha$-ethoxyethoxy-$\alpha$-ethyl)methoxyacetanilide,
p-($\alpha$-benzyloxyethoxy-$\alpha$-methyl)methoxyacetanilide,
p-($\alpha$-ethoxy-$\alpha$-propyl-$\alpha$-methyl)methoxyacetanilide, and
p-($\alpha$-cyclopropylmethoxy-$\alpha$-methyl)methoxyacetanilide.

Example 5

Into a dry glass stoppered flask is placed 6 g. of p-hydroxyacetanilide and 25 ml. of anhydrous propyl vinyl ether with a gentle shaking of the flask to mix the reactants. Next, trace amounts of the acid catalyst, anhydrous p-toluenesulfonic acid is added to the flask and the flask agitated until the reactants are thoroughly mixed. The reaction mixture is then allowed to stand at ambient conditions for 2 to 3 hours and filtered. Next, 0.1 ml. of pyridine in benzene, which contained 40 mg. of pyridine per ml., is added to the flask. The contents of the flask are refiltered, and the excess propyl vinyl ether is stripped from the product under reduced pressure to yield p-($\alpha$-propoxy-$\alpha$-methyl)methoxyacetanilide.

Example 6

To a solution of 50 mg. of p-hydroxyacetanilide in 20 ml. of anhydrous dioxane there is added 10 ml. an excess of ethyl isopropenyl ether, boiling point 59° to 62° C., and the solution continually stirred to ensure a uniform mixture of the ingredients. To this mixture is next added 5 mg. of the acid catalyst, anhydrous p-toluenesulfonic acid, and the resulting mixture is maintained with gentle stirring at ambient temperature for 72 hours. Next, the reaction mixture is diluted with 25 ml. of anhydrous ether containing 10 ml. of pyridine and washed with 10 ml. aliquots of 5% sodium carbonate. Finally, the mixture is filtered, the residue is extracted with methylene chloride, freed of solvent and dried over anhydrous magnesium sulfate to give p - ($\alpha$ - methoxy - $\alpha$,$\alpha$ - dimethyl)methoxyacetanilide.

The novel and useful p-(substituted)alkovyacetanilide compounds of the invention are adaptable for administration for their physiological and pharmaceutical analgesic and antipyretic effects from drug delivery systems, such as drug delivery bandages, intravaginal dispensing systems, suppositories, and the like, wherein the delivery device is manufactured from naturally occurring and synthetic polymeric materials. Representative of materials acceptable for the fabrication of drug delivery systems containing the compounds for controlled drug administration to a recipient, include materials such as poly(vinylchloride), poly(isoprene), poly(butadiene), poly(ethylene), ethylene-vinyl acetate copolymers, poly(dimethylsiloxane), hydrophilic hydrogels of esters of acrylic and methacrylic acid, poly(vinyl acetates), propylenevinyl acetate copolymers, and the like.

The novel compounds of the invention can be used by the pharmaceutical and the veterinary arts for their analgesic and antipyretic effects in a variety of pharmaceutical preparations or veterinary preparations. In these preparations, the new compounds are administrable in the form of tablets, pills, powder-mixtures, capsules, injectables, solutions, suppositories, ointments, emulsions, dispersions, food premix, and in other suitable forms. The pharmaceutical or veterinary preparations which contain the compound, or a mixture of compounds, is conveniently admixed with a non-toxic pharmaceutical organic carrier or a non-toxic pharmaceutical inorganic carrier, usually about 0.01 mg. up to 2500 mg. of compound, or larger amounts, per dosage unit form. Typical of the pharmaceutically acceptable carriers are, for example, lactose, starches, magnesium stearate, talc, vegetable oils, polyalkylene glycols, petroleum jelly, methyl cellulose, ethyl cellulose, polyvinylpyrrolidone, calcium carbonate, ethyl oleate, isopropyl myristate, benzyl benzoate, sodium carbonate, potassium carbonate, and other conventionally used acceptable carriers. The pharmaceutical preparations may also contain non-toxic auxiliary substances such as emulsifying, preserving, wetting agents, and the like, as for example, sorbitan monolaurate, triethanolamine oleate, dioctyl sodium sulfosuccinate, methyl and propyl esters of p-hydroxybenzoic acid, sodium hexametaphosphate, polyethylene sorbitol, polyethylene glycols 4000–6000, and the like.

Exemplary of a typical method for preparing a tablet containing the active agents is to first mix the agent or a mixture of agents with a non-toxic binder such as gelatin, acacia mucilage, ethyl cellulose, or the like. The mixing is suitably carried out in a standard V-blender and usually under anhydrous conditions. Next, the just prepared mixture is slugged through conventional tablet machines, and the slugs fabricated into tablets. The freshly prepared tablets can be coated, or they can be left uncoated. Representative of suitable coatings are the non-toxic coatings including shellac, methylcellulose, carnauba wax, styrenemaleic acid copolymers, and the like. For oral administration, compressed tablets containing 0.01 mg., 5 mg., 25 mg., 50 mg., 500 mg., etc., up to 2500 mg. are manufactured in the light of the above disclosure and by art known fabrication techniques well known to the art and set forth in Remington's Pharmaceutical Science, chapter 39, Mack Publishing Co., 1965. The pharmaceutical manufacture of a formulation is shown in Example 7.

Example 7

| Ingredient: | Per tablet, mg. |
|---|---|
| p-($\alpha$-Ethoxy-$\alpha$-methyl)methoxyacetanilide | 2.0 |
| Corn starch | 15.0 |
| Corn starch paste | 4.5 |
| Calcium carbonate | 15.0 |
| Lactose | 67.0 |
| Calcium stearate | 2.0 |
| Dicalcium phosphate | 50.0 |

To formulate the tablets, uniformly blend the p-($\alpha$-ethoxy-$\alpha$-methyl)methoxyacetanilide, corn starch, lactose, dicalcium phosphate and calcium carbonate under dry conditions in a conventional V-blender until all the ingredients are uniformly mixed together. Next, the corn starch paste is prepared as a 10% paste and it is blended with the just prepared mixture until a uniform mixture is obtained. The mixture is then passed through a standard light mesh screen, dried in an anhydrous atmosphere, and then blended with calcium stearate, and compressed into tablets, and coated if desired. Other tablets containing 0.01, 0.05, 0.25, 1.0, 5.0, 50.0 mgs. etc., are prepared in a like fashion.

The manufacture of capsules containing 0.1 milligram to 2500 milligrams for oral use consisting essentially of mixing the active compound with a non-toxic carrier and enclosing the mixture in a polymeric sheath, usually gelatin or the like. The capsule can be in the art known soft form of a capsule made by enclosing the compound in an intimate dispersion with an edible oil, or the capsule can be a hard capsule consisting essentially of the novel compound mixed with a non-toxic solid, such as talc, calcium stearate, calcium carbonate, or the like. Exemplary of a typical medical use for employing a capsule containing 5 mg. of p-($\alpha$-ethoxy-$\alpha$-methyl)methoxyacetanilide is its use as therapeutically indicated ad libitum for an analgesic effect. Capsules containing 0.1 mg., 0.5 mg., 2.5 mg., 5.0 mg., 10 mg., 20 mg., 50 mg., and the like, of the novel compounds, singularly, or mixtures of two or more are prepared, for example as follows:

Example 8

| Ingredient: | Per capsule, mg. |
|---|---|
| p-($\alpha$-Ethoxy-$\alpha$-methyl)methoxyacetanilide | 2.0 |
| Calcium carbonate | 100.0 |
| Lactose, U.S.P. | 200.0 |
| Starch | 130.0 |
| Magnesium stearate | 4.5 |

The above ingredients are blended together in a standard blender and then discharged into commercially available capsules. When higher concentrations of the active agent is used, a corresponding reduction is made in the amount of lactose.

The dose administered, whether a single or a daily dose, will vary with the particular compound of the invention employed because of the varying potency of the compounds, the chosen route of administration, and the size of the recipient. The dosage administered is not subject to definite bounds, but it will usually be an effective amount, or the equivalent on a molar basis of the pharmacologically active free form produced upon the metabolic release of the active drug to achieve its desired pharmacological and physiological effect. The dose administered for the management of pain in avians, mammals, including primates and humans, farm animals and sport animals is, for example, for mammals by the oral route 300 mg. to 900 mg. daily; by the rectal route, 300 mg. to 500 mg. 2 or 3 times per day, with the average oral or rectal dose of 300 mg. 2 to 4 times a day. The veterinary dose for horses and cattle is about 5 to 50 gm. a day, for sheep and swine, 1 to 5 gm. a day, for dogs, 0.25 gm. to 1 gm. a day, and cats, 100 mg. to 300 mg. per day.

Suitable topical preparations can easily be prepared by, for example, mixing 500 mg. of p-(substituted)alkoxyacetanilide prepared according to the invention with 15 g. of cetyl alcohol, 1 g. of sodium lauryl sulfate, 40 g. of liquid silicone D.C. 200, sold by Dow Corning Co., Midland, Mich., 43 g. of sesame oil, 0.25 g. of methylparaben and 0.15 g. of propylaraben, and warming the mixture with constant stirring to about 75° C., and then permitting the preparation to congeal. The preparation can be readily applied to the skin by induction, or it can be applied topically by dispensing the preparation from a conventional surgical gauze, and the like. The novel compounds penetrate the outermost layer of the skin, the stratum corneum, more readily that unetherized p-hydroxyacetanilide type compounds, and as such they lend themselves to topical administration. Suitable procedures for the preparation of topical formulations are set forth in Remington's Pharmaceutical Science, chapter 37, as cited supra.

For administering the novel compounds of the invention to valuable domestic household, sport or farm animals, such as dogs, sheep, goats, cattle, etc., or for administering to laboratory animals such as mice, rats, guinea pigs, monkeys, etc., for scientific studies, the compounds are administered by preparing a food premix, such as mixing them with dried fish meal, oatmeal, straw, hay, ground corn, mash, and the like, and then the prepared premix is added to the regular feed, thereby administering the compound to the domestic or laboratory animal in the form of feed.

The above examples and disclosures are set forth merely for illustrating the mode and the manner of the invention and various modifications and embodiments can be made by those skilled in the art, in the light of the invention, without departing from the spirit of the invention.

I claim:

1. A compound of the formula:

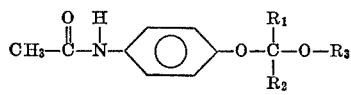

wherein $R_1$ and $R_2$ are selected from the group consisting of lower alkyl of 1 to 6 carbon atoms, lower alkoxy of 1 to 6 carbon atoms, cycloalkyl of 3 to 6 carbon atoms, phenyl, lower alkyl substituted phenyl and halogen substituted phenyl, and $R_3$ is selected from the group consisting of lower alkyl of 1 to 6 carbon atoms, cycloalkyl of 3 to 6 carbon atoms, phenyl, lower alkyl substituted phenyl and halogen substituted phenyl.

2. A compound according to claim 1 wherein the compound is p-(loweralkoxy - $\alpha,\alpha$ - diloweralkyl)methoxyacetanilide.

3. A compound according to claim 1 wherein the compound is p-($\alpha$-ethoxy-$\alpha,\alpha$-dimethyl)methoxyacetanilide.

References Cited
FOREIGN PATENTS 770,411   3/1957   Great Britain _____ 260—562

OTHER REFERENCES

R. Sekera et al., Bull. Soc. Chem. Fr., pp. 401–404 (1959).

HARRY I. MOATZ, Primary Examiner

U.S. Cl. X.R.

424—324

UNITED STATES PATENT OFFICE
CERTIFICATE OF CORRECTION

Patent No. 3,786,090          Dated January 15, 1974

Inventor(s) Anwar Hussain

It is certified that error appears in the above-identified patent and that said Letters Patent are hereby corrected as shown below:

Column 2, line 21, delete "reach" and insert --reaches--.

Column 2, lines 56-57, delete "a".

Column 3, line 30, delete "ataining" and insert --attaining--.

Column 3, line 32, delete "aceanilitde" and insert --acetanilide--.

Column 3, line 40, delete "0 o 4" and insert --0 to 4--.

Column 3, line 62, delete "as" and insert --is--.

Column 3, line 71, delete "goup" and insert --group--.

Column 5, line 32, delete "ctalyst" and insert --catalyst--.

Column 6, lines 3-5, delete all material contained therein and insert the following:

--p-($\alpha$-cyclohexylmethoxy-$\alpha$-methyl)methoxyacetanilide,
  p-($\alpha$-phenoxymethoxy-$\alpha$-methyl)methoxyacetanilide,
  p-($\alpha$-benzyloxy-$\alpha$-methyl)methoxyacetanilide, and--.

Column 6, line 72, delete "alkovyacetanilide" and insert --alkoxyacetanilide--.

Column 8, line 36, delete "is" in the first occurrence and insert --are--.

Column 8, line 63, delete "propylaraben" and insert --propylparaben--.

Signed and sealed this 16th day of July 1974.

(SEAL)
Attest:

McCOY M. GIBSON, JR.         C. MARSHALL DANN
Attesting Officer             Commissioner of Patents